(12) United States Patent
Doyle

(10) Patent No.: US 7,246,779 B2
(45) Date of Patent: Jul. 24, 2007

(54) TELESCOPIC LEGS AND TABLES

(75) Inventor: James E. Doyle, Grandville, MI (US)

(73) Assignee: Suspa Incorporated, Grand Rapids, MI (US)

( * ) Notice: Subject to any disclaimer, the term of this patent is extended or adjusted under 35 U.S.C. 154(b) by 114 days.

(21) Appl. No.: 10/738,806

(22) Filed: Dec. 17, 2003

(65) Prior Publication Data

US 2004/0129844 A1    Jul. 8, 2004

Related U.S. Application Data

(60) Provisional application No. 60/434,527, filed on Dec. 18, 2002.

(51) Int. Cl.
*A47B 91/00* (2006.01)
*A47B 9/20* (2006.01)

(52) U.S. Cl. .............. 248/188.8; 52/126.1; 52/126.6; 108/144.11; 108/147.19; 248/188.5; 248/357

(58) Field of Classification Search ............. 248/357, 248/188.2, 188.3, 188.7, 188.8; 108/147, 108/147.19, 144.1; 12/126.6, 126.5; 249/19, 249/18
See application file for complete search history.

(56) References Cited

U.S. PATENT DOCUMENTS

| | | | |
|---|---|---|---|
| 4,462,197 A * | 7/1984 | D'Alessio et al. ............. 52/637 |
| 4,711,184 A | 12/1987 | Wallin et al. |
| 4,926,593 A * | 5/1990 | Johnston .................... 52/126.4 |
| 4,984,654 A * | 1/1991 | Anderson ................. 182/186.7 |
| 5,050,829 A | 9/1991 | Sykes |
| 5,285,733 A | 2/1994 | Waibel |
| 5,322,025 A * | 6/1994 | Sherman et al. ............ 108/147 |
| 5,553,550 A | 9/1996 | Doyle |
| 6,059,258 A * | 5/2000 | Jackson ....................... 249/18 |
| 6,302,280 B1 | 10/2001 | Bermes |
| 6,352,037 B1 | 3/2002 | Doyle |
| 6,360,675 B1 | 3/2002 | Jones |
| 6,435,048 B1 | 8/2002 | Zimmerman |
| 6,595,144 B1 | 7/2003 | Doyle |
| 6,705,239 B2 * | 3/2004 | Doyle ......................... 108/147 |
| 6,832,746 B2 * | 12/2004 | McCracken et al. ......... 248/357 |
| 6,871,454 B2 * | 3/2005 | Coday et al. .............. 52/126.6 |
| 7,165,361 B2 * | 1/2007 | Vanagan .................... 52/126.6 |
| 2004/0129844 A1 * | 7/2004 | Doyle ..................... 248/188.8 |

OTHER PUBLICATIONS

Published U.S. Appl. No. 10/218,650 (U.S. Pub. No. 2003/0033963) entitled Adjustable Table Assembly, filed on Aug. 14, 2002.
Bosch Aluminum Structural Framing System brochure, Version 2.0, cover and pp. 9-6 and 12-7.

\* cited by examiner

*Primary Examiner*—Cari D. Friedman
*Assistant Examiner*—Tan Le
(74) *Attorney, Agent, or Firm*—Price, Heneveld, Cooper, DeWitt & Litton, LLP

(57) ABSTRACT

A telescopic leg has a housing with a lift cylinder or mechanical screw jack type lift and an external track for adjustably coupling to a member. Such telescopic legs can be used to define a variety of table base configurations by providing multiple angularly aligned tracks in each leg for receiving cross supports adjustably coupled to the tracks.

18 Claims, 10 Drawing Sheets

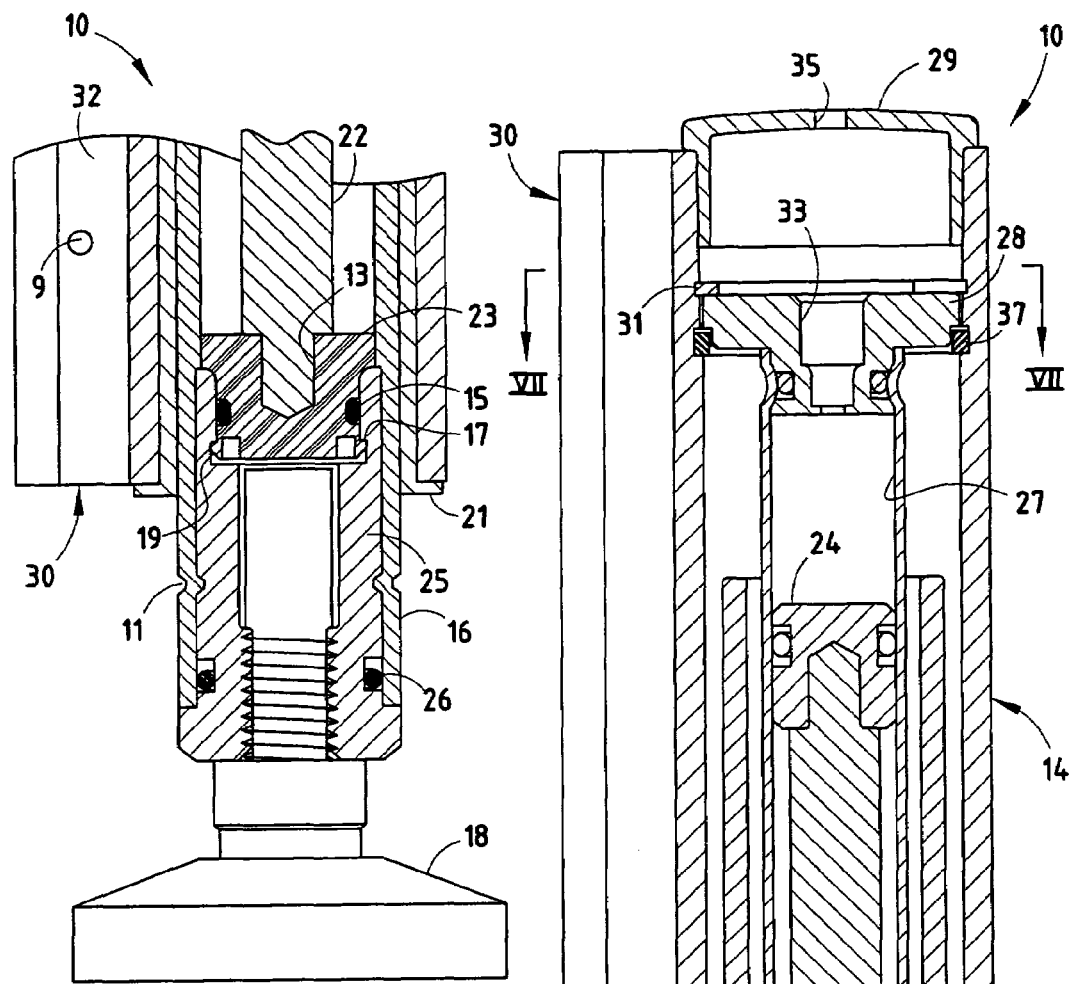
FIG. 5
FIG. 6
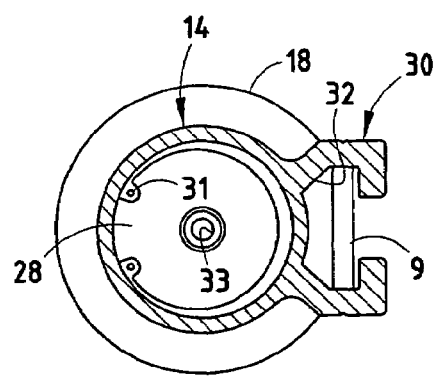
FIG. 7

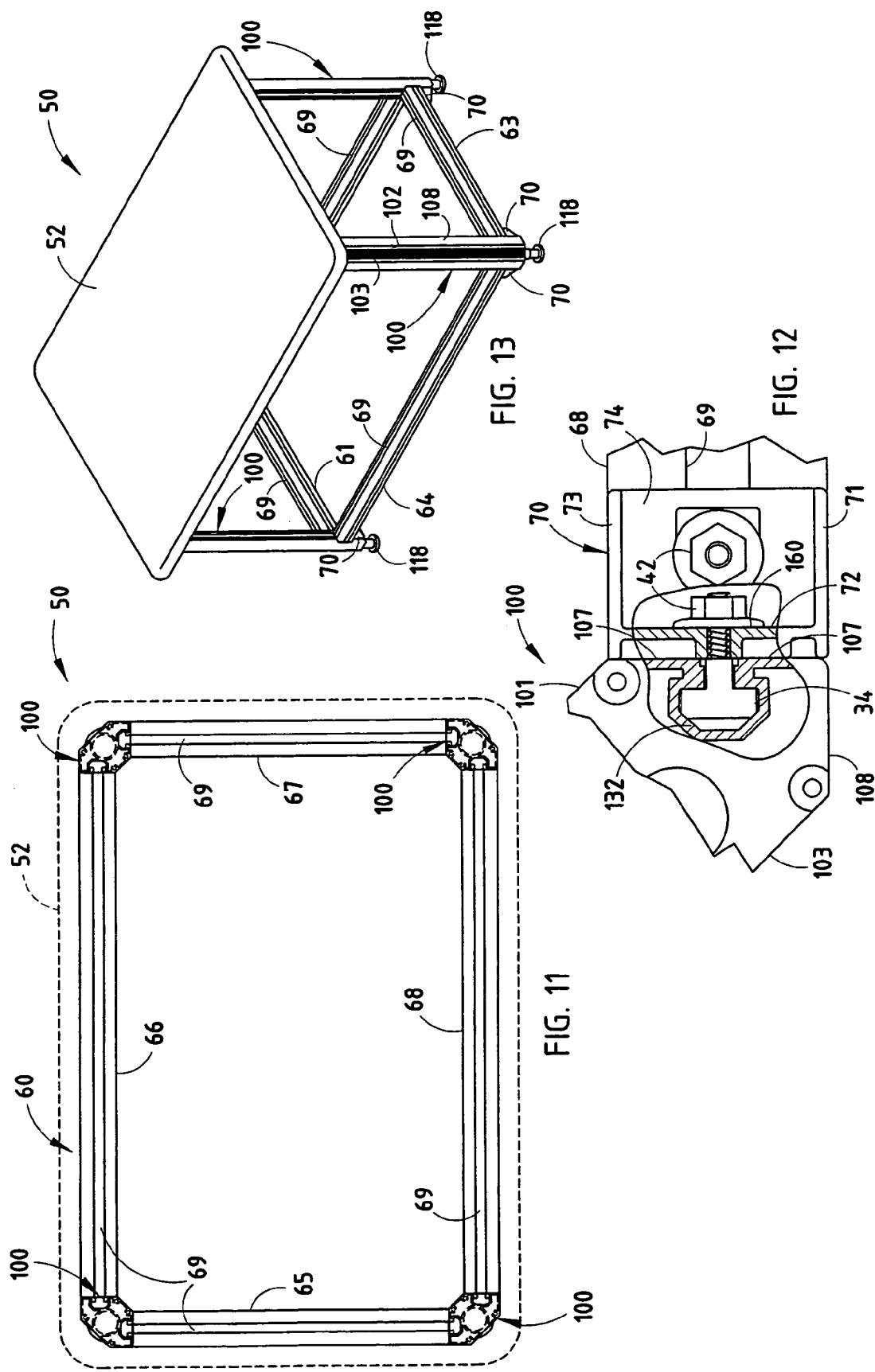

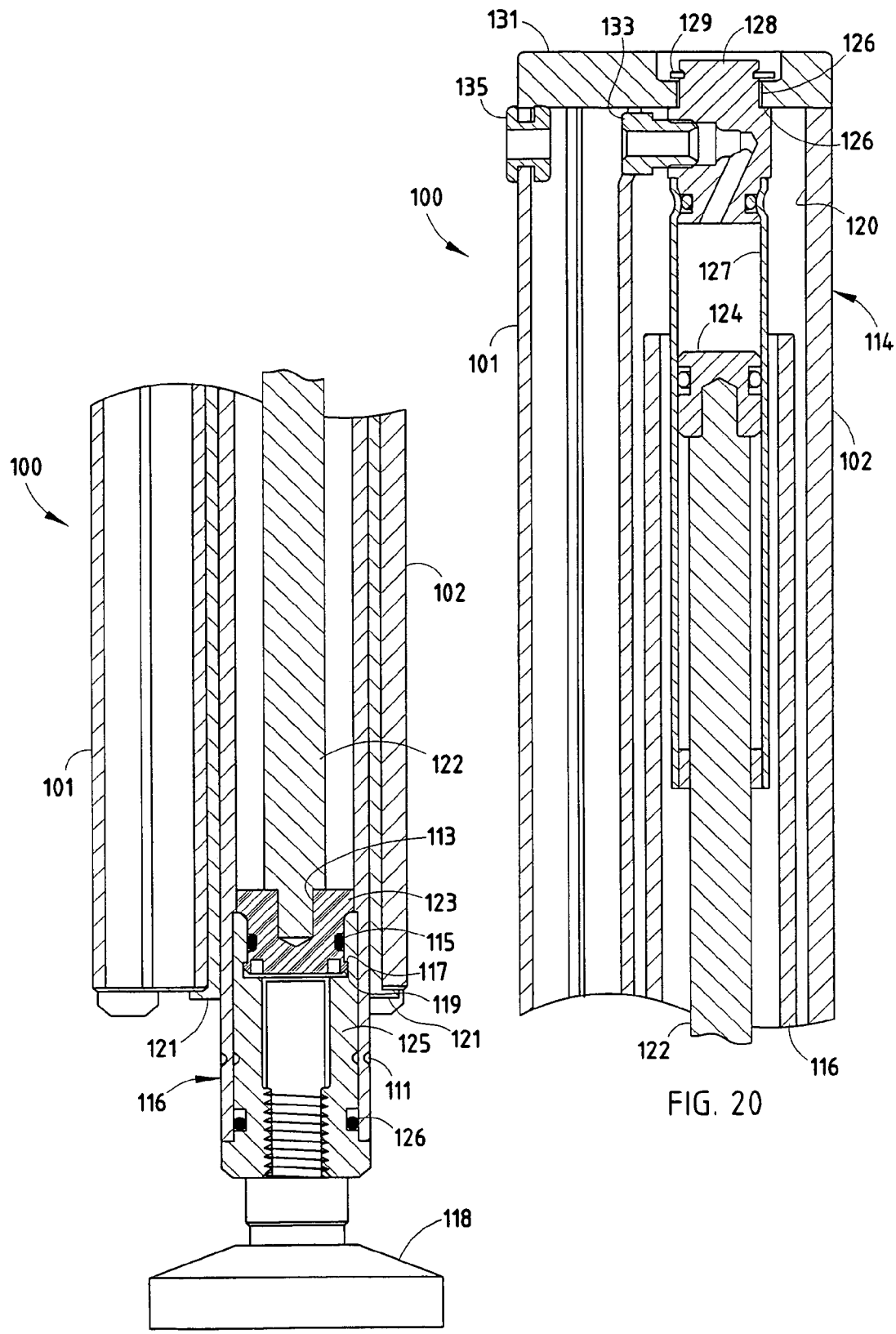

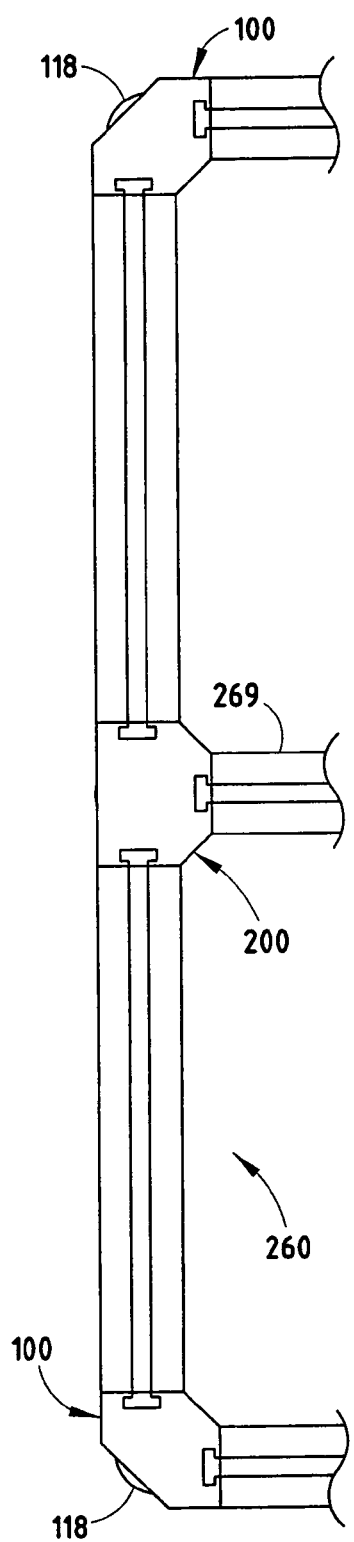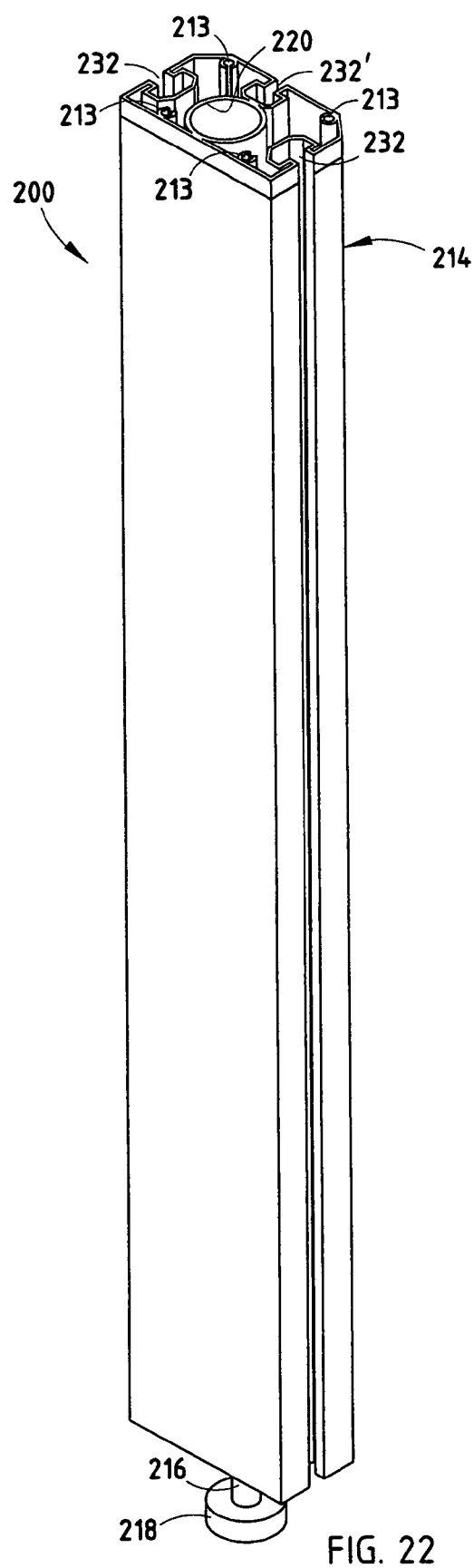
FIG. 21
FIG. 22

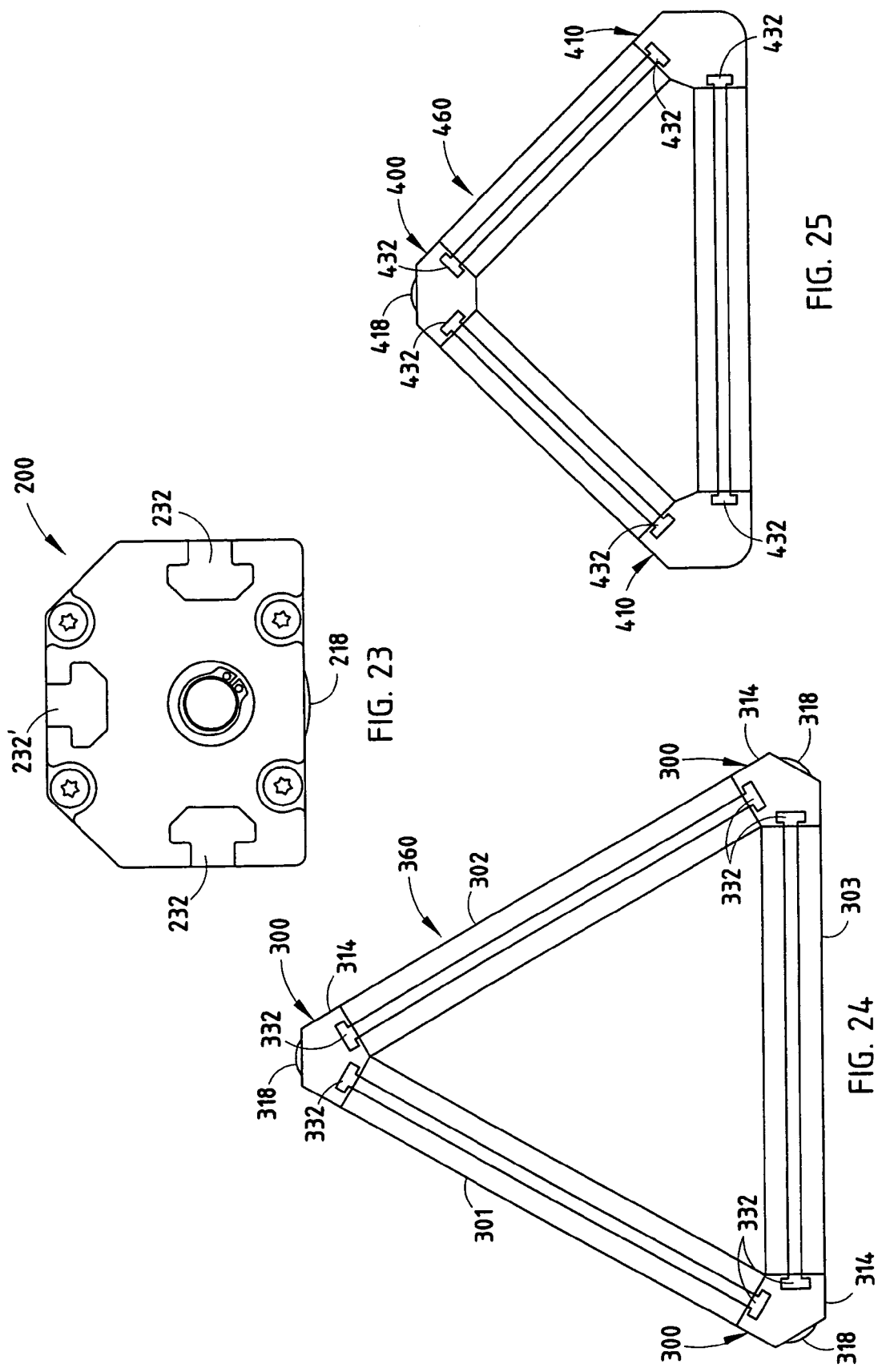

TELESCOPIC LEGS AND TABLES

CROSS-REFERENCE TO RELATED APPLICATIONS

This application claims priority under 35 U.S.C. § 119(e) on U.S. Provisional Application No. 60/434,527, entitled TABLE WITH ADJUSTABLE LEGS, filed on Dec. 18, 2002, by James E. Doyle, the entire disclosure of which is incorporated herein by reference.

BACKGROUND OF THE INVENTION

The present invention relates to an extruded leg which integrally includes a lift cylinder and at least one slotted track for adjustably receiving one or more struts to provide a system for manufacturing height adjustable objects, such as tables in selectable configurations.

Telescopic table legs are commonly used in work places for adjusting work surface heights for a variety of uses, such as positioning the work surface for standing or various sitting positions. Electrically driven linear actuators are frequently employed to control the height of tables having telescopic legs. A few such proposals are disclosed in U.S. Pat. Nos. 5,553,550, 6,352,037, 6,360,675, 6,435,048, 6,494,005, and published application U.S. Ser. No. 09/870,091 (Publication No. 2002/0074477 A1). These systems each employ dedicated leg designs which allow use of an actuator for raising the table of a given configuration between different height adjusted levels. Likewise, pending U.S. patent application entitled ADJUSTABLE TABLE ASSEMBLY, Ser. No. 10/218,650, filed Aug. 14, 2002, discloses a table with adjustable height but one which has a specific configuration.

There are several extruded aluminum strut systems which allow different table configurations to be fabricated from universal extruded members, such as provided by Bosch Automation, Parker Hannifin Corporation, and others. Such tables, which can be configured in a variety of shapes and sizes, once constructed, are not adjustable without reassembly. In the past, in order to vertically adjust such tables, lift cylinders have been secured to the legs of the tables by drilling holes through the legs and extending fasteners through the legs and into threaded apertures in the lift cylinder housing for mounting the cylinders on the side of the legs. Although such construction provides adjustable table heights for a table configuration utilizing the extruded members, the mounting of such lift cylinders is somewhat difficult, requiring drilling of holes through the table legs. Once mounted, the lift cylinder cannot be vertically adjusted.

There exists a need, therefore, for an improved system which allows the telescopic height adjustment of tables and construction of tables with different configurations, including different sizes, dimensions, and shapes and which provides a greater adjustment flexibility.

SUMMARY OF THE INVENTION

The telescopic leg assembly of the present invention integrates a lift cylinder actuator and an extruded leg having at least one elongated track for receiving struts which can be used to define a support base for a variety of adjustable members. In a preferred embodiment, the actuator includes a housing which defines one or more elongated tracks in the form of slots for receiving fasteners for cross-members defining a table support structure. In one embodiment of the invention, a lift cylinder housing includes a single longitudinally extending extruded track defining a T-shaped slot for receiving a fastener nut and threaded fastener coupled to a cross member without the need for threaded apertures in the actuator housing. In another embodiment of the invention, the lift cylinder integrally includes two or more tracks which may be elongated T-shaped slots arranged in angular relationship to define corner legs, intermediate legs, or angularly related legs for a variety of table base configurations. In all embodiments of the present invention, a lift cylinder housing is provided with at least one elongated track such that a lift cylinder is integrated within the leg so-formed, which can be attached to a support member to provide vertical adjustment thereto.

These and other features, objects and advantages of the present invention will become apparent upon reading the following description thereof together with reference to the accompanying drawings.

BRIEF DESCRIPTION OF THE DRAWINGS

FIG. 5 is a greatly enlarged fragmentary vertical cross-sectional view of the lower end of the leg shown in FIG. 4;

FIG. 6 is a greatly enlarged fragmentary cross-sectional view of the upper section of the leg shown in FIG. 4;

FIG. 7 is a cross-sectional view taken through section lines VII-VII of FIG. 6;

FIG. 11 is a top plan view, partly broken away and in phantom, of a table employing the frame shown in FIG. 8;

FIG. 12 is an elongated fragmentary top plan view, partly broken away and partly in cross section, of one of the corner connections of the table base of FIG. 11;

FIG. 13 is a perspective view of a table employing the frame shown in FIG. 8;

FIG. 19 is an enlarged fragmentary cross-sectional view of the lower section of the leg shown in FIG. 16;

FIG. 20 is an enlarged fragmentary cross-sectional view of the upper section of the leg shown in FIG. 16;

FIG. 21 is a fragmentary top plan view of a table frame incorporating a telescopic center support leg;

FIG. 22 is a perspective view of the telescopic center support leg;

FIG. 23 is an enlarged top plan view of the leg shown in FIG. 22;

FIG. 24 is a top plan view of a generally triangular table frame using telescopic legs embodying the present invention; and FIG. 25 is a top plan view of another triangular table frame using telescopic legs embodying the present invention.

DETAILED DESCRIPTION OF THE PREFERRED EMBODIMENT

Figure 1:
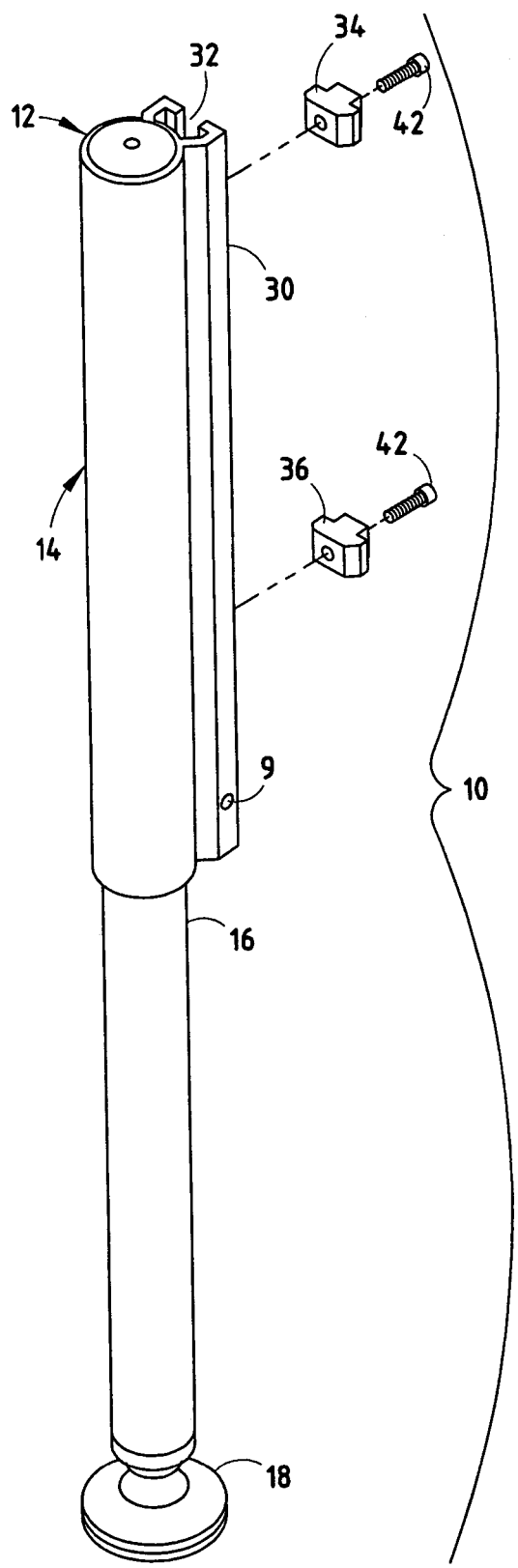
FIG. 1 is a perspective exploded view of a telescopic leg of the present invention including a lift cylinder and housing with an elongated track.
Figure 2:
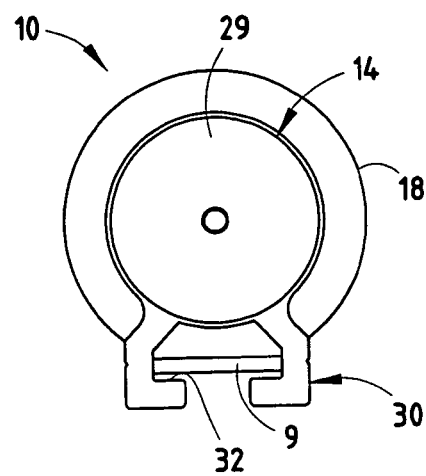
FIG. 2 is an enlarged top plan view of the structure shown in FIG. 1.
Figure 3:
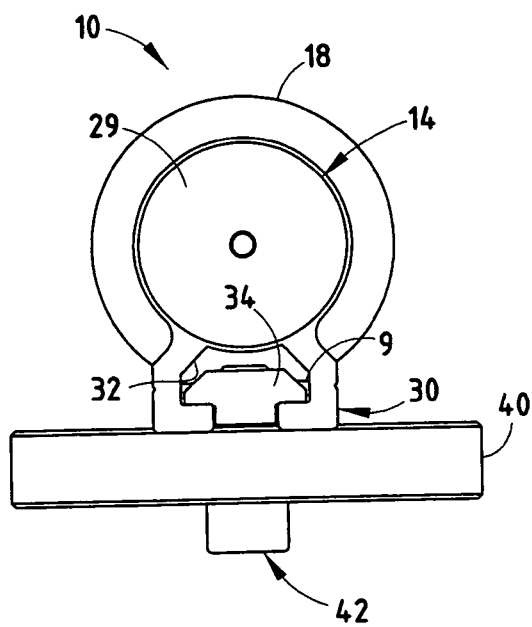
FIG. 3 is a view of the structure shown in FIG. 2 with a member attached thereto.
Figure 4:
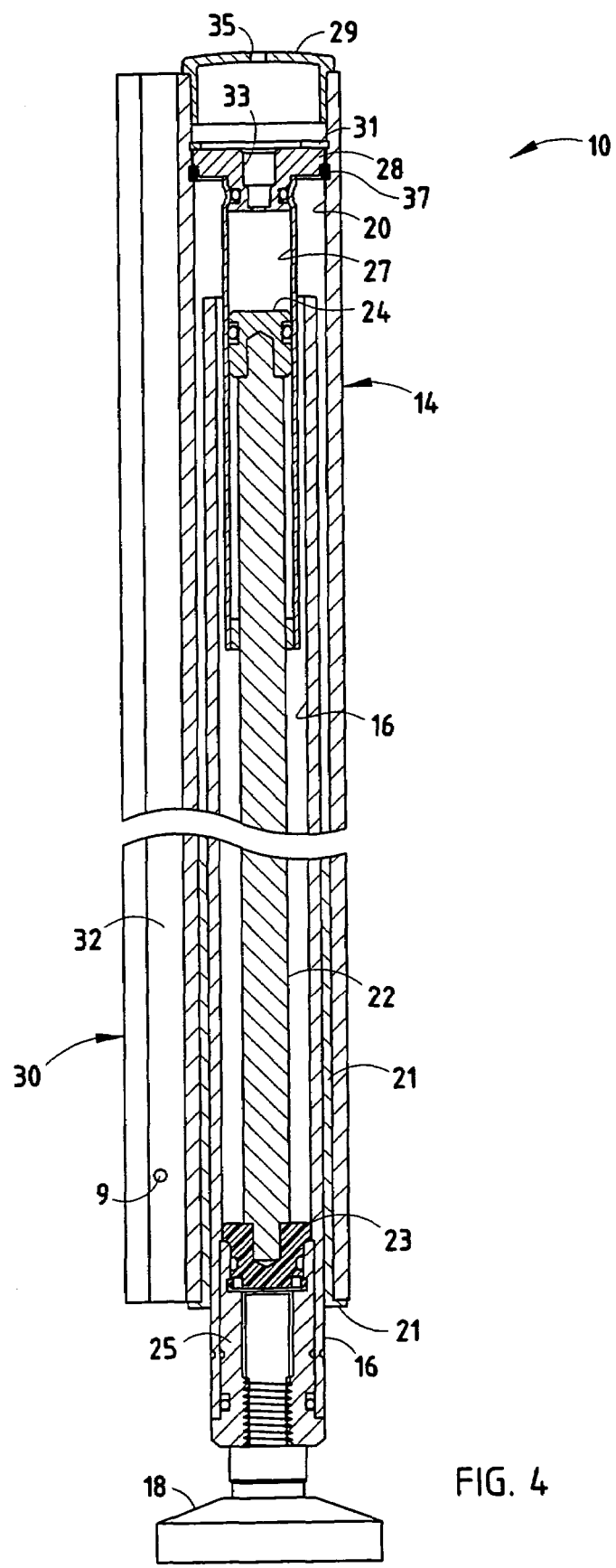
FIG. 4 is a vertical cross-sectional view, partly broken away, of the telescopic leg shown in FIG. 1.

Turning initially to the first embodiment of the invention shown in FIGS. 1-7, there is shown a telescopic leg 10 embodying the present invention, which includes a lift cylinder 12 which includes an outer housing 14 that is integrally extruded of metal, such as aluminum or an aluminum alloy. The lift cylinder includes an inner telescopic leg 16 having an adjustable foot or glide 18 secured to the lower end thereof in a conventional manner. The housing 14 includes an inner cylindrical bore 20 (FIG. 4) for receiving cylindrical telescopic leg 16 which, as best seen in FIGS. 4-6, is coupled by a seal cap 23 and glide adapter 25 to the lower end of piston rod 22. The upper end of rod 22 is coupled to the piston 24 of a hydraulic cylinder 27, which is positioned within bore 20 and coaxially within cylindrical leg 16. Pressure is applied to the piston rod 24 through a connecting head 28 to which fluid pressure is selectively applied from an external supply of pressurized fluid such as pneumatic or hydraulic pressure to extend leg 16 from a collapsed position within housing 14, as seen in FIG. 4, to an extended position, as shown in FIG. 1, and positions therebetween. The details of the lift cylinder itself, as also shown in FIGS. 5 and 6, are described in greater detail in U.S. Pat. No. 6,711,985, which issued Mar. 30, 2004, the disclosure of which is incorporated herein by reference.

The end of barbed piston rod 22 is pressed into a central aperture 13 in seal cap 23, which is snap-fitted by flanges 19 (FIG. 5) to an annular shoulder 17 in the glide adapter 25. An O-ring 15 seals cap 23 to glide adapter 25. An adjustable glide 18 is threadably extended into the glide adapter 25, as seen in FIG. 5. The glide adapter is secured to leg 16 by a crimp connection 11 (FIG. 5) and includes a lower O-ring seal 26.

Piston 24 rides along the cylindrical internal diameter of piston cylinder 27, which is coupled to a connecting head 28 which, in turn, is concentrically mounted within bore 20 near the top of housing 14. A cylindrical guide bushing 21 extends between the outer diameter of leg 16 and the inner cylindrical bore 20 of housing 14, as best seen in FIGS. 4 and 5. Fluid pressure to the lift cylinder integrally formed in leg 10 is applied through a threaded fitting 33 in connecting head 28 by a conventional fluid coupling extending through an aperture 35 in a cover cap 29 snap-fitted within the top of housing 14, as best seen in FIGS. 2-4 and 6. A snapring 31 (FIGS. 6 and 7) fixedly secures the connecting head 28 within the bore 20 of cylindrical housing 14 against an annular shoulder and seal 37 (FIG. 6).

Extruded housing 14 integrally includes an external vertically extending elongated track 30 which includes a T-shaped slot 32 extending longitudinally along substantially the length of housing 14 to slidably and adjustably receive threaded T-shaped locking nuts 34 and 36 (FIGS. 1 and 3) for coupling a support member, such as member 40 shown in FIG. 3, to the T-shaped nut 34 positioned within slot 32 of track 30 by means of fastening screws 42. Typically, a pair of T-shaped nuts 34, 36 will be mounted in spaced relationship to a member 40, such as a cross beam, to secure the crossbeam in an adjustable position along the vertically extending length of track 30. A pin 9 (FIGS. 1, 2, 4, 5, and 7) is press-fit in apertures in track 30 and extends across the slot 32 at the lower end of track 30 to provide a reference location for the lowermost T-nut 36. The predetermined location of pin 9 is typically near the lower end of slot 32. Thus, when several legs 10 are mounted to objects, they can be vertically aligned by extending the fastening screws 42 through apertures in the objects at the same level. The pin 9 also serves as a stop to prevent T-shaped nut 36 from sliding from the slot 32.

The telescopic leg 10 so defined can be coupled to a member 40 in a variety of applications to provide an adjustable support leg. Leg 10 can be employed in applications other than table leg configurations to provide a vertically adjustable connection to a member 40 in a number of environments which allow member 40 to be adjustably positioned along the vertical length of slot 32 in housing 14 of the telescopic leg as well as subsequently adjusted by the extension of telescopic leg 16 within leg 10.

Figure 8:
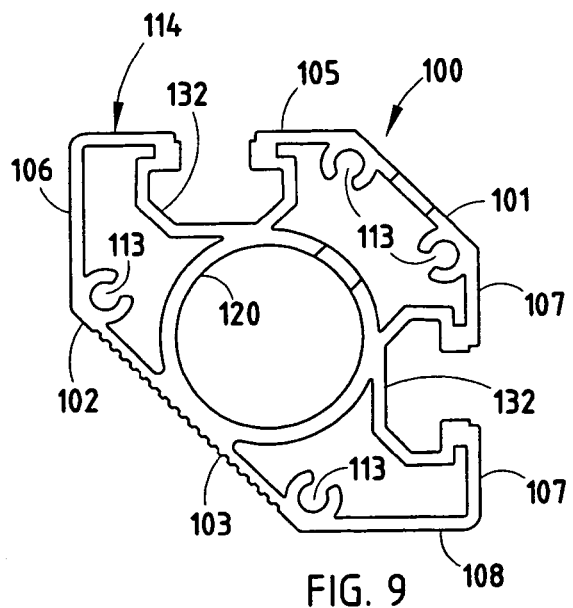
FIG. 8 is a perspective view of a table base incorporating telescopic legs embodying the present invention.
Figure 9:
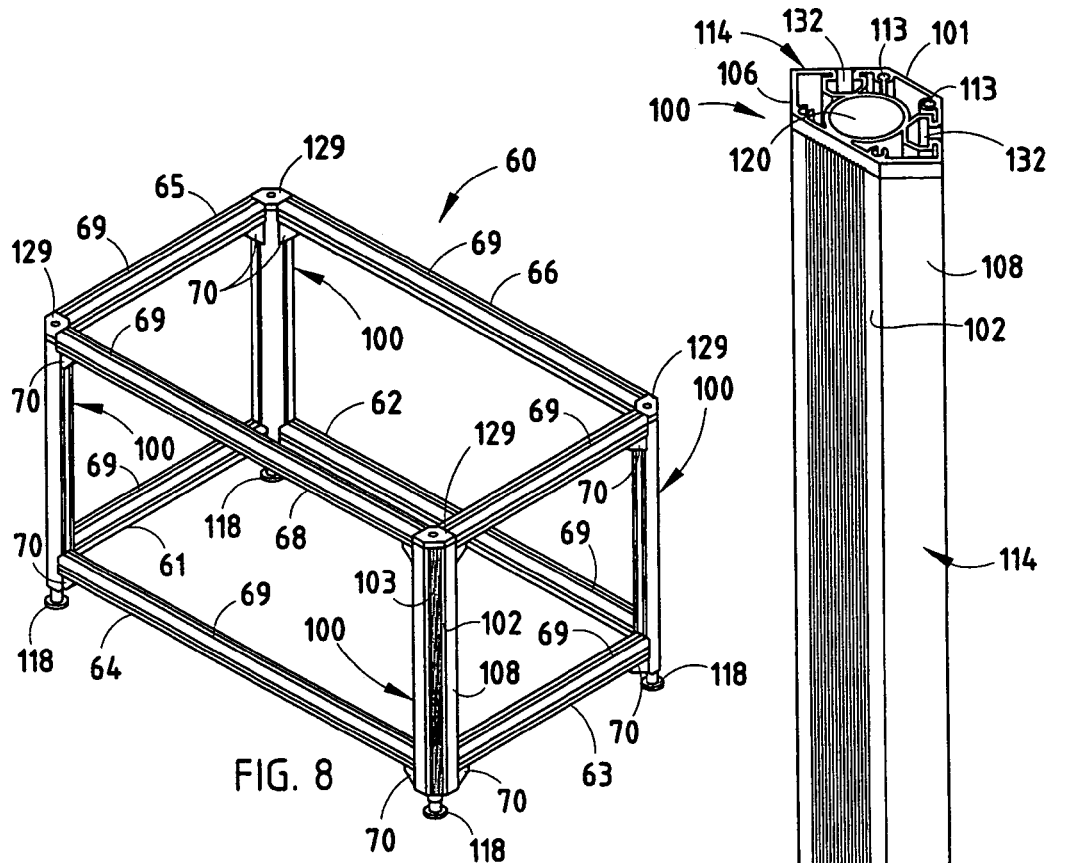
FIG. 9 is an enlarged top plan view of an extrusion forming one of the legs of FIG. 8, shown without the lift cylinder mounted therein.
Figure 10:
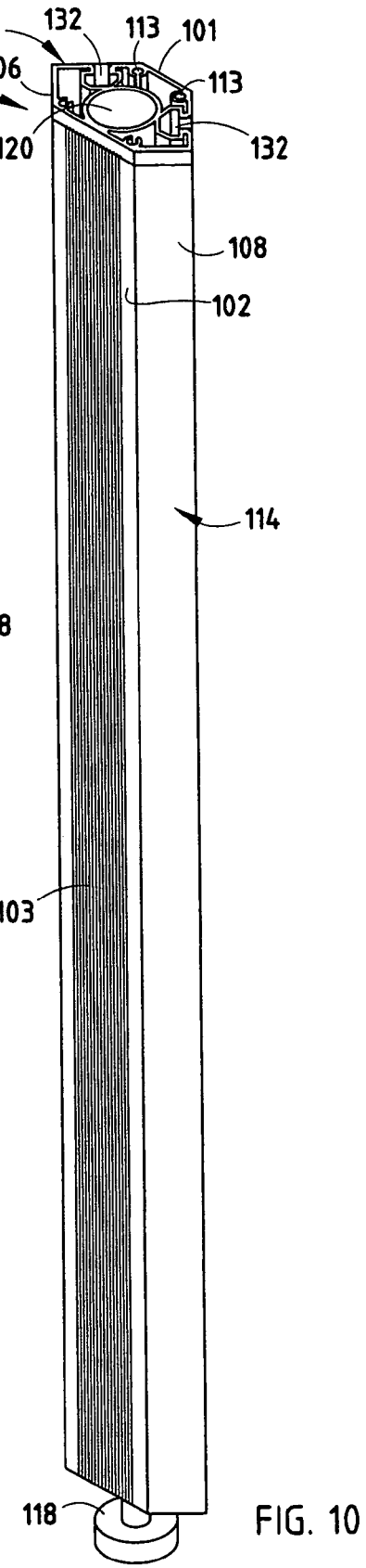
FIG. 10 is a perspective view of one of the legs employed in the table frame shown in FIG. 8.
Figure 14:
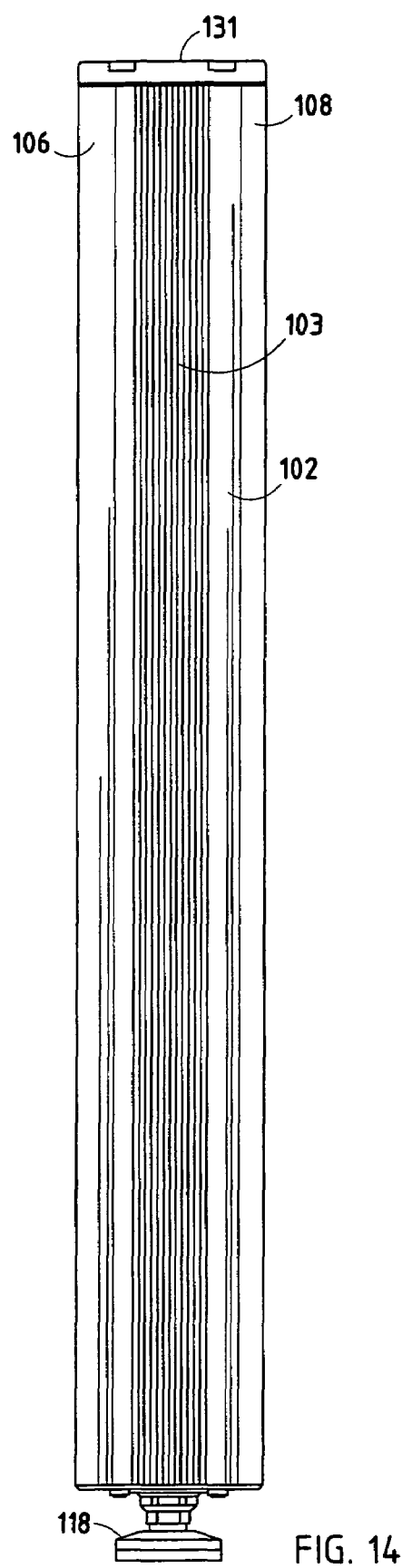
FIG. 14 is a front elevational view of the leg shown in FIG. 10.
Figure 15:
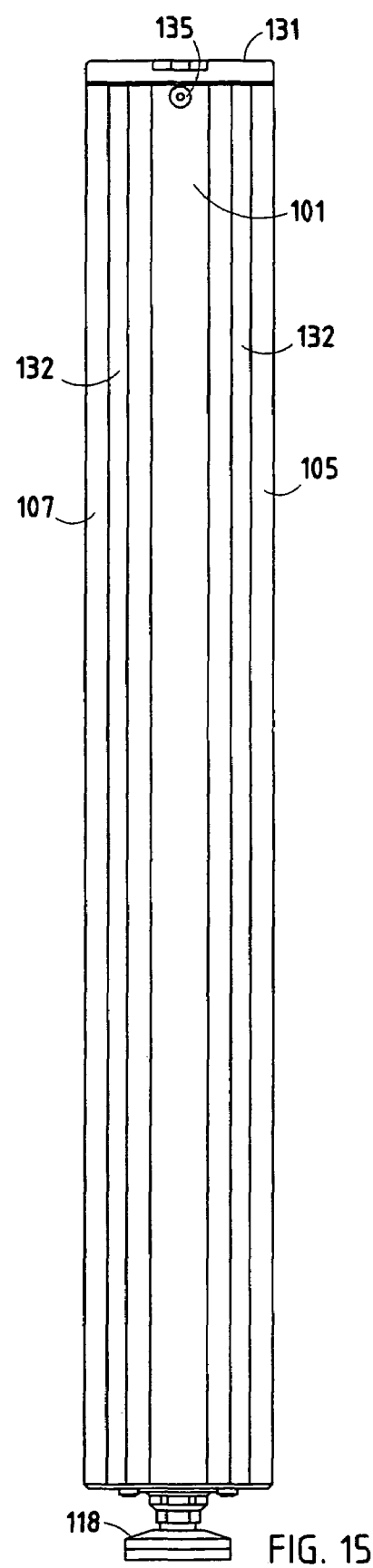
FIG. 15 is a rear elevational view of the leg shown in FIG. 13.

A specific rectangular table configuration employing the system of the present invention is now described in connection with FIGS. 8-20, which show in FIGS. 8, 11, and 13 a table 50 (FIG. 13) with a top 52 supported on a base 60 (FIGS. 8 and 11). The base includes four telescopic legs 100 and cross members 61-68 extending between and adjustably coupled to the legs. Components of legs 100, which are similar to the components of leg 10, are identified by similar reference numerals preceded by the reference number "1". Table base 60 includes four identical telescopic legs 100 in each of the corners of the rectangular table which legs, as seen in FIGS. 9 and 10, each include an extruded housing 114 having a telescopic leg 116 (FIG. 16) extendable therefrom. Fluid pressure is applied to the pistons 124 of each of the legs through a connecting head 128, which is supplied fluid pressure through threaded connection 133 and a fluid conduit (not shown) extending through a grommet 135 extending in one of the side walls 101 of leg 100. Leg 100 is generally triangular in shape with walls 102, 105, and 107, although it includes six specific walls including wall 101, an opposed wall 102 which may include a serrated decorative surface 103 (as seen in FIGS. 9 and 10), which is exposed to the outer corners of table 50 to provide a decorative finish to the legs 100. Each of the extruded legs 100 include two side walls 105 and 107 extending at 45° angles to wall 101 and which include integrally formed vertically extending elongated T-shaped slots 132 for receiving T-shaped mounting nuts, such as nuts 34 and 36 shown in FIG. 1 in a similar manner as described below.

Figure 16:
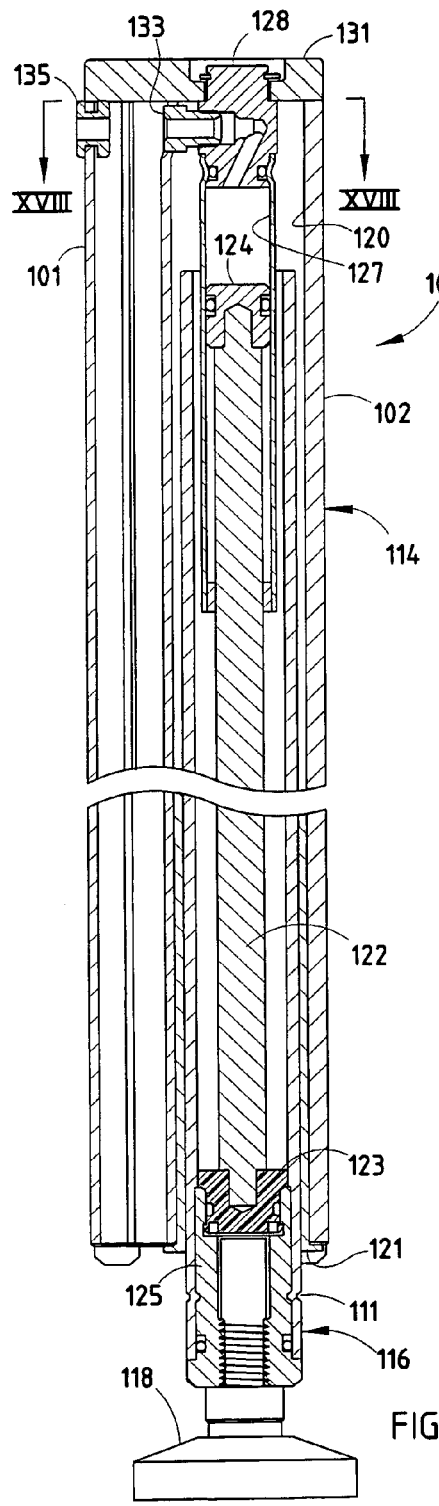
FIG. 16 is a vertical cross-sectional view of the leg shown in FIGS. 10, 14, and 15.
Figure 17:
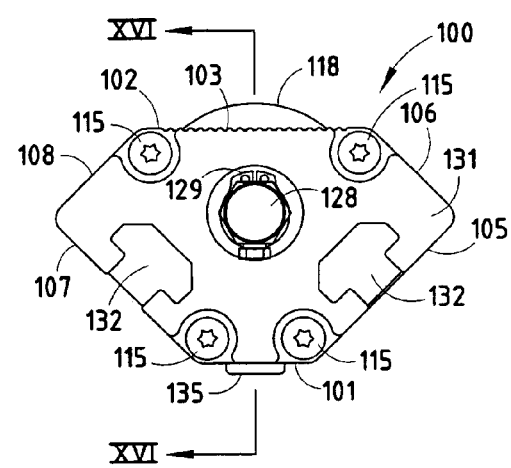
FIG. 17 is a top plan view of the leg shown in FIG. 16.
Figure 18:
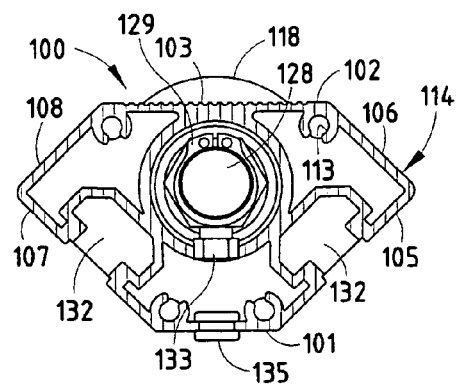
FIG. 18 is a cross-sectional view of the table leg shown in FIG. 16, taken along section line XVIII-XVIII of FIG. 16.

Housing 114 for legs 100 also includes a pair of integrally formed sides 106 and 108 joining sides 105 to 102 and 107 to 102, respectively at 45° angles to complete the outer periphery of the extruded aluminum or aluminum alloy housing 114 of the leg 100. Housing 114 includes a cylindrical center bore 120 defining the inner cylindrical wall of the telescopic leg assembly so formed, as seen in FIGS. 16, 19, and 20. Thus, the integral leg 100 shown in FIGS. 8-20 is formed with a telescopic extension leg and includes two right angle related mounting tracks defining T-shaped extruded slots 132 extending the length of the outer housing 114 defining each of the four legs of table frame 60. Frame 60 includes lower and upper cross members 61-68 having ends coupled to each of the legs 100, as seen in FIG. 12, by means of conventional right angled corner brackets 70 and fastening screws 142 extending through an aperture in an end wall 72 of each of the corner brackets 70 into legs 100 and through a floor 74 of the brackets 70 (FIG. 12) into cross members 61-68 using T-shaped nuts 34 positioned in alignment in T-shaped slots. Each of the corner brackets 70 include a vertical wall 72 and a floor 74 through which the fasteners 142 extend. Each of the cross members 61-68 include T-shaped slots 69 which receive T-shaped nuts in a conventional manner for securing the floor of each corner bracket to each cross member 61-68 while the vertical wall 72 of each corner bracket 70 is secured to a leg 100 by mounting a T-shaped nut 34 into slot 132 and using a fastener 42, as best seen in FIG. 12. Brackets 70 are conventional, commercially available members which include reinforcing sides 71 and 73 for added strength.

As can be appreciated, the design of table base 60 can be any particular shape depending upon the length of the opposed facing cross members. It can be a square table, a narrow rectangular table, or a wide rectangular table, as desired. The adjustable height of the table is selected by the length of the housing 114 and the extension of telescopic leg 116 carried therein, such that a table having a shape, size, and adjustable height to conform to a desired work place or other environment can be provided. The upper end of table legs 100 are enclosed by a cap 131 (FIGS. 8, 14, and 15), which together with base 60 can include suitable structure for mounting a tabletop 52 thereto, as seen in FIG. 13. Telescopic leg 116 is secured to housing 114 by the coupling of head 128 (FIGS. 16-18 and 20) to cap 131 by the use of a snap ring 129 which is fitted within an annular recess in the head 128. Ring 129 engages the upper side of shoulder 126 in cap 131 with the lower side of shoulder 126 being engaged by a shoulder 126 on the head 128, as best seen in FIG. 20. Cap 131 is subsequently secured to housing 114 by screws 115 (FIG. 17), which extend within sockets 113 (FIGS. 9 and 18), which secures telescopic leg 116 in cylindrical bore 120 of the housing 114. The lower end of the housing includes an annular bushing 121 (FIG. 19) for guiding the telescopic leg 116 within bore 120 during extension and retraction of the leg. Telescopic leg 116 is coupled to the piston rod 122 of the lift member by the glide adapter 125 (FIG. 19) such that actuation of the hydraulic cylinder 127, which moves piston 124 and rod 122, results in the extension and retraction of the telescopic leg 116. A glide 118 is threadably secured to the glide adapter 123 (FIG. 19) at the lower end of leg 100. The inner surfaces of walls 101, 106, and 108 include sockets 113 (FIGS. 9, 10 and 18) for receiving self-threading screws 115 to secure table-supporting hardware thereto or for securing caps 131 to the top of the table legs 100 so formed. The internal components and height adjustable function of legs 100 are substantially identical in operation to leg 10 shown in FIGS. 1-7 and described above, so no additional description is necessary.

Relatively large tables, such as shown in fragmentary view in FIG. 21, may require a center support leg 200, which is also illustrated in FIG. 22 and which similarly includes an extruded housing 214 with an integral central cylindrical bore 220 for receiving an adjustable leg 216 therein in the same manner as the previous embodiments. Housing 214, however, includes two 180° opposed slots 232 and a third intermediate slot 232 which extends orthogonally between slots 232 such that a cross support 269 can be fitted in the orthogonally extending slot 232 using T-shaped nuts and a corner bracket 70. Thus, by the use of the table legs 100 and 200, shown in FIGS. 21 and 22, a significantly larger table base 260 can be formed utilizing two such center support telescopic legs in conjunction with four corner legs 100 to form the base of a table. Suitable upper and lower cross supports intercouple legs 100 and legs 200 to legs 100, as illustrated in FIG. 21, and are secured to the associated legs in the manner illustrated and described in connection with FIG. 12.

Other table configurations can be provided, such as triangular tables (shown in FIGS. 24 and 25). In FIG. 24, a base 360 for a triangular table includes three table legs 300, which each include a pair of T-shaped slots 332 positioned at 60° angles for defining a particular equilateral shaped triangular table top as shown. Equal length upper and lower cross supports 301, 302, and 303 are coupled to the legs 300 in the same manner as illustrated in FIG. 12. Legs 300, like legs 10, 100, and 200, have an extruded housing 314 with a cylindrical bore and telescopic leg coupled to glides 318 for providing an adjustable height table.

Another triangular shaped base 460 can be made with one leg 400 (FIG. 25) having two 90° spaced tracks and two legs 410 with 45° spaced tracks to define a right angled triangular table base 460 suitable for positioning in a corner of a room. Legs 400 and 410 are otherwise constructed in the same manner as in the previously described embodiments.

As can be appreciated, the adjustable legs of the present invention thus provide an integral telescopically adjustable leg with at least one elongated mounting track. In one preferred embodiment, multiple tracks in the form of slots can be angularly related in any desired configuration to provide differently configured table bases to provide adjustable table supports for a variety of table configurations. Although the preferred embodiment disclosed employs fluid-actuated cylinders for the telescopic extension of the adjustable legs, in some embodiments it may be desirable to utilize mechanical screwjack type manual or motor-driven adjustable telescopic legs, such as disclosed in U.S. Pat. No. 6,595,144, the disclosure of which is incorporated herein by reference. Such legs also would integrally include an extruded housing having T-shaped or other configured slots for receiving cross members for defining table bases of different configurations. Also, the track(s) extending along the outer surface of the telescopic leg can take on other forms and may, for example, be T-shaped projections for receiving a T-shaped slot in a mating member that includes a suitable locking fastener.

These and other modifications to the preferred embodiment of the invention will become apparent to those skilled in the art and will fall within the spirit and scope of the invention as defined by the appended claims.

The invention claimed is:
1. A telescopic leg comprising:
 an elongated stationery leg defined by an extruded housing having an upper end and a lower end, wherein said lower end of said housing has an opening, said housing also including a generally cylindrical bore for receiving a lift member therein; said housing further including at least one elongated track integrally formed in said housing externally to said bore, said track extending in parallel spaced relationship to the axis of said cylindrical bore and facing outwardly for receiving a fastener for coupling said leg to another member at a selectable location along said track;
 a lift member mounted in fixed relationship within said housing, said lift member including a piston actuated cylinder including a piston rod and a leg coupled to said piston rod for extending outwardly from said bore through said opening at said lower end of said housing, said lift member further including a mounting head at an end opposite said leg; and a cap coupled to said upper end of said housing and a coupling member extending between said mounting head of said lift member and said cap for securing said lift member within said bore.

2. The telescopic leg as defined in claim 1 wherein said housing includes at least two elongated tracks extending in angular relationship with respect to each other and each including a generally T-shaped slot facing outwardly from the axis of said bore.

3. The telescopic leg as defined in claim 1 wherein said lift member is a hydraulic lift.

4. The telescopic leg as defined in claim 1 wherein said housing is extruded of an aluminum material.

5. A telescopic leg comprising:
an elongated leg defined by an extruded housing having an upper end and a lower end, said housing including a generally cylindrical bore for receiving a lift member therein; said housing further including at least one elongated track integrally formed in said housing externally to said bore, said track extending in parallel spaced relationship to the axis of said cylindrical bore and facing outwardly for receiving a fastener for coupling said leg to another member at a selectable location along said track;
a lift member including a piston actuated cylinder mounted within said bore, said lift member including a piston rod and a leg coupled to said piston rod for extending outwardly from said bore at said lower end of said housing, said lift member further including a mounting head at an end opposite said leg;
a cap coupled to said upper end of said housing and to said mounting head of said lift member for securing said lift member within said bore; and
a cylindrical bushing extending between said bore and said leg at said lower end of said housing.

6. The telescopic leg as defined in claim 5 and further including a glide adapter coupled to a lower end of said leg and to an end of said piston rod.

7. The telescopic leg as defined in claim 6 and further including a glide adjustably coupled to said glide adapter.

8. A telescopic leg comprising:
an elongated leg defined by an extruded housing including a generally cylindrical bore for receiving a lift member therein; said housing further including at least one elongated track integrally formed in said housing externally to said bore, said track extending in parallel spaced relationship to the axis of said cylindrical bore and adapted to receive a fastener for coupling said leg to another member at a selected location along said track;
a lift member including a piston actuated cylinder mounted to be entirely enclosed within said bore, said lift member including a piston rod and a leg coupled to said piston rod for extending outwardly from said bore at one end of said housing, said lift member further including a mounting head located at a second end of said housing opposite said one end;
a cap coupled to said second end of said housing and to said mounting head of said lift member for securing said lift member within said bore of said housing; and
wherein said head includes an annular recess and an outwardly extending shoulder spaced from said recess and wherein said cap includes an inwardly extending shoulder engaged by said shoulder of said head, and further including a snap ring extending in said recess on a side of said shoulder of said cap opposite said shoulder of said head for holding said lift member within said bore of said housing.

9. The telescopic leg as defined in claim 8 and further including a cylindrical bushing extending between said bore and said leg at said one end of said housing.

10. The telescopic leg as defined in claim 9 and further including a glide adapter coupled to a lower end of said leg and to an end of said piston rod.

11. The telescopic leg as defined in claim 10 and further including a glide adjustably coupled to said glide adapter.

12. A table base including a plurality of legs, each leg comprising:
an extruded housing having an upper end and a lower end, wherein said lower end of said housing has an opening, said housing also including a generally cylindrical bore for receiving a lift member therein; said housing further including at least two elongated tracks integrally formed in said housing externally to said bore, said tracks extending in angular relationship to each other and in parallel spaced relationship to the axis of said cylindrical bore and facing outwardly for receiving a fastener for coupling said leg to other legs at a selectable location along said tracks;
a lift member mounted in fixed relationship within said housing, said lift member including a piston actuated cylinder mounted within said bore, said lift member including a piston rod and a leg coupled to said piston rod for extending outwardly from said bore through said opening at said lower end of said housing, said lift member further including a mounting head at an end opposite said leg; and
a cap coupled to said upper end of said housing and a coupling member extending between said mounting head of said lift member and said cap for securing said lift member within said bore.

13. The table base as defined in claim 12 wherein said tracks are generally T-shaped slots.

14. A table base including a plurality of legs, each leg comprising:
an extruded housing having an upper end and a lower end, said housing including a generally cylindrical bore for receiving a lift member therein; said housing further including at least two elongated generally T-shaped tracks integrally formed in said housing externally to said bore, said tracks extending in angular relationship to each other and in parallel spaced relationship to the axis of said cylindrical bore and facing outwardly for receiving a fastener for coupling said leg to other legs at a selectable location along said tracks;
a lift member including a piston actuated cylinder mounted within said bore, said lift member including a piston rod and a leg coupled to said piston rod for extending outwardly from said bore at said lower end of said housing, said lift member further including a mounting head at an end opposite said leg;
a cap coupled to said upper end of said housing and to said mounting head of said lift member for securing said lift member within said bore; and
a plurality of cross struts coupled to said legs by generally T-shaped threaded nuts which fit within said generally T-shaped slots and threaded fasteners extending into said nuts.

15. The table base as defined in claim 14 wherein said tracks extend orthogonally with respect to each other.

16. A table base including a plurality of legs, each leg comprising:

an extruded housing having an upper end and a lower end, said housing including a generally cylindrical bore for receiving a lift member therein; said housing further including at least two elongated tracks integrally formed in said housing externally to said bore, said tracks extending in angular relationship to each other and in parallel spaced relationship to the axis of said cylindrical bore and facing outwardly for receiving a fastener for coupling said leg to other legs at a selectable location along said tracks;

a lift member including a piston actuated cylinder mounted within said bore, said lift member including a piston rod and a leg coupled to said piston rod for extending outwardly from said bore at said lower end of said housing, said lift member further including a mounting head at an end opposite said leg;

a cap coupled to said upper end of said housing and to said mounting head of said lift member for securing said lift member within said bore; and wherein said head includes an annular recess and an outwardly extending shoulder spaced from said recess and wherein said cap includes an inwardly extending shoulder engaged by said shoulder of said head, and further including a snap ring extending in said recess on a side of said shoulder of said cap opposite said shoulder of said head for holding said lift member within said bore of said housing.

17. The table base as defined in claim 16 and further including a cylindrical bushing extending between said bore and said leg at said lower end of said housing.

18. The table base as defined in claim 17 and further including a glide adapter coupled to a lower end of said leg and to an end of said piston rod, and a glide adjustably coupled to said glide adapter.

\* \* \* \* \*

UNITED STATES PATENT AND TRADEMARK OFFICE
CERTIFICATE OF CORRECTION

| | | |
|---|---|---|
| PATENT NO. | : 7,246,779 B2 | Page 1 of 2 |
| APPLICATION NO. | : 10/738806 | |
| DATED | : July 24, 2007 | |
| INVENTOR(S) | : James E. Doyle | |

It is certified that error appears in the above-identified patent and that said Letters Patent is hereby corrected as shown below:

In the drawings Sheet 8 of 10, Fig. 20, 126 (lower) should be --126'-- as shown below:

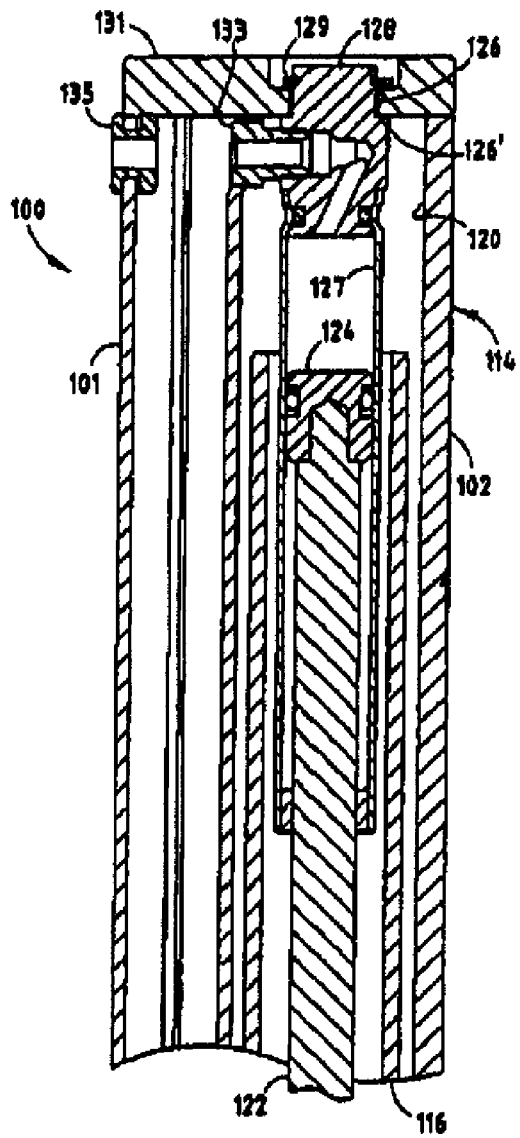

FIG. 20

UNITED STATES PATENT AND TRADEMARK OFFICE
CERTIFICATE OF CORRECTION

PATENT NO. : 7,246,779 B2
APPLICATION NO. : 10/738806
DATED : July 24, 2007
INVENTOR(S) : James E. Doyle It is certified that error appears in the above-identified patent and that said Letters Patent is hereby corrected as shown below:

Column 5, line 60, "intermediate slot 232" should be --intermediate slot 232'--.

Signed and Sealed this

Fifteenth Day of April, 2008

JON W. DUDAS
*Director of the United States Patent and Trademark Office*